United States Patent
Kinnebrew

(10) Patent No.: US 6,296,559 B1
(45) Date of Patent: Oct. 2, 2001

(54) METHOD AND APPARATUS FOR SKINNING AN ANIMAL CARCASS

(76) Inventor: Phillip W. Kinnebrew, 1917 Hooper St., Atlanta, GA (US) 30032-4135

( * ) Notice: Subject to any disclaimer, the term of this patent is extended or adjusted under 35 U.S.C. 154(b) by 0 days.

(21) Appl. No.: 09/579,974

(22) Filed: May 26, 2000

(51) Int. Cl.⁷ .................................................. A22B 5/16
(52) U.S. Cl. ........................................ 452/128; 452/125
(58) Field of Search ................................. 452/128, 125, 452/129, 130

(56) References Cited

U.S. PATENT DOCUMENTS

| | | | |
|---|---|---|---|
| 3,626,550 | * 12/1971 | Troy | 452/129 |
| 3,871,084 | * 3/1975 | Carrington et al. | 452/128 |
| 3,894,313 | 7/1975 | Miller . | |
| 4,376,326 | 3/1983 | Noroy . | |
| 4,425,678 | 1/1984 | Pepper . | |
| 4,751,768 | * 6/1988 | Trujillo, Sr. | 452/129 |
| 4,806,063 | 2/1989 | York . | |
| 4,860,404 | 8/1989 | Flachs . | |
| 4,873,749 | 10/1989 | Couture . | |
| 4,903,372 | 2/1990 | Jones . | |
| 5,049,110 | 9/1991 | Owens . | |
| 5,211,601 | * 5/1993 | Cope | 452/187 |
| 5,336,124 | 8/1994 | Garside . | |
| 5,482,501 | * 1/1996 | Frits | 452/125 |
| 5,562,534 | 10/1996 | McGough . | |
| 5,588,907 | 12/1996 | DePietro . | |
| 5,791,858 | 8/1998 | Sasser . | |
| 5,820,455 | 10/1998 | Breedlove . | |

FOREIGN PATENT DOCUMENTS

| | | | | |
|---|---|---|---|---|
| 249881 | * | 8/1912 | (DE) | 452/125 |
| 1559-900 | * | 1/1980 | (GB) | 452/125 |

* cited by examiner

Primary Examiner—Willis Little
(74) Attorney, Agent, or Firm—Patent Focus, Inc.; Richard C. McComas

(57) ABSTRACT

A substantially rectangular platform that has a top surface and a bottom surface. A pair of sectional tubular stanchions has one end connected to the platform. A cross-member is connected between the pair of stanchions other ends. A winch with a cable and an elongated carcass lifting member is mounted onto the cross-member. A pair of adjustable carcass leg retaining members each having one end secured to the winch's elongated carcass lifting member. The adjustable carcass leg retaining member's other ends are detachably securable to the carcass's legs. A pair of adjustable carcass skin retaining members each having one end secured to the platform by hooks. The adjustable carcass skin retaining member's other end is detachably securable to the carcass's skin. The winch is activated and lifts the legs of the carcass via the pair of adjustable carcass leg retaining members while the pair of adjustable carcass skin retaining members hold the skin in place to the platform, skinning the carcass.

15 Claims, 6 Drawing Sheets

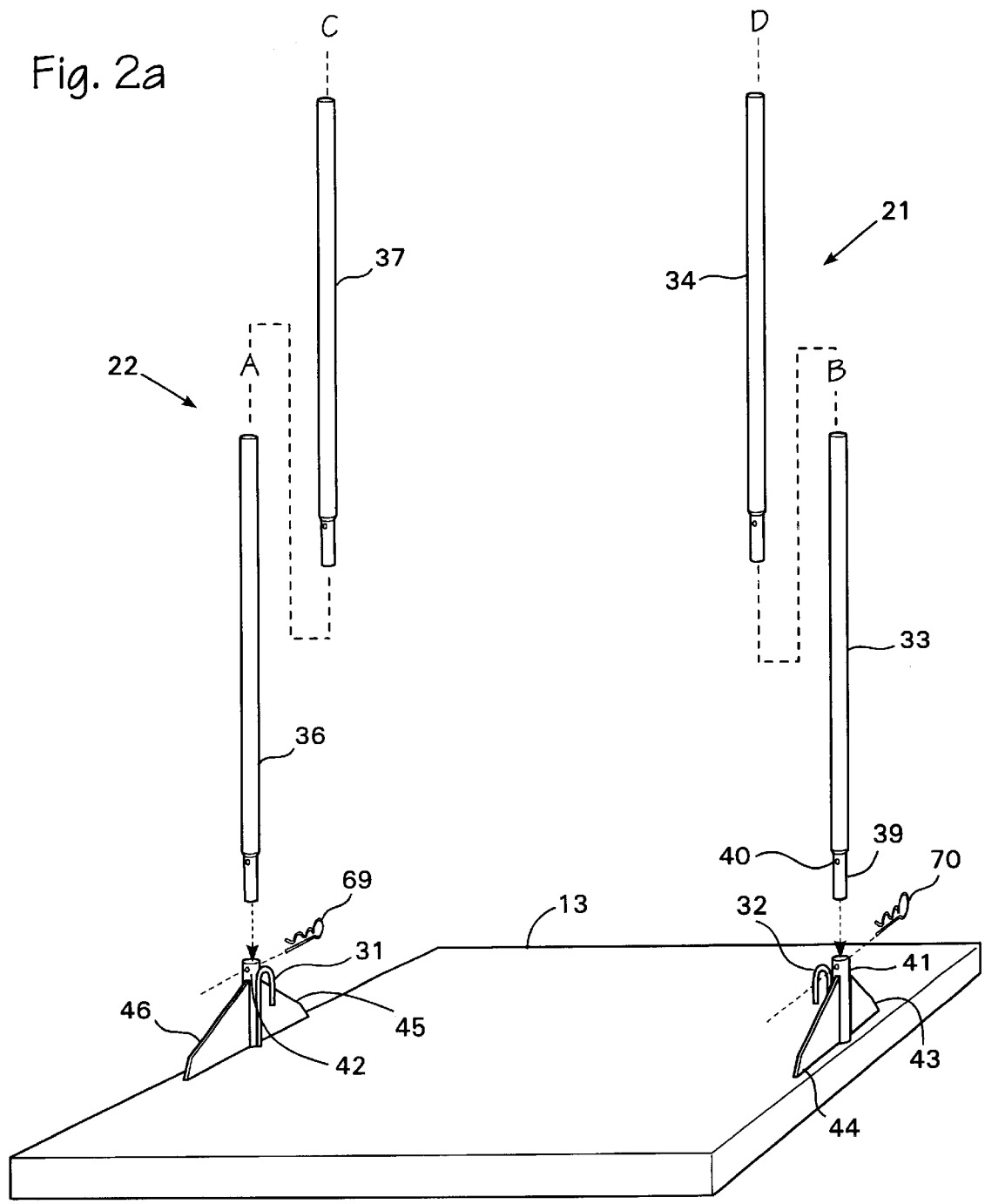

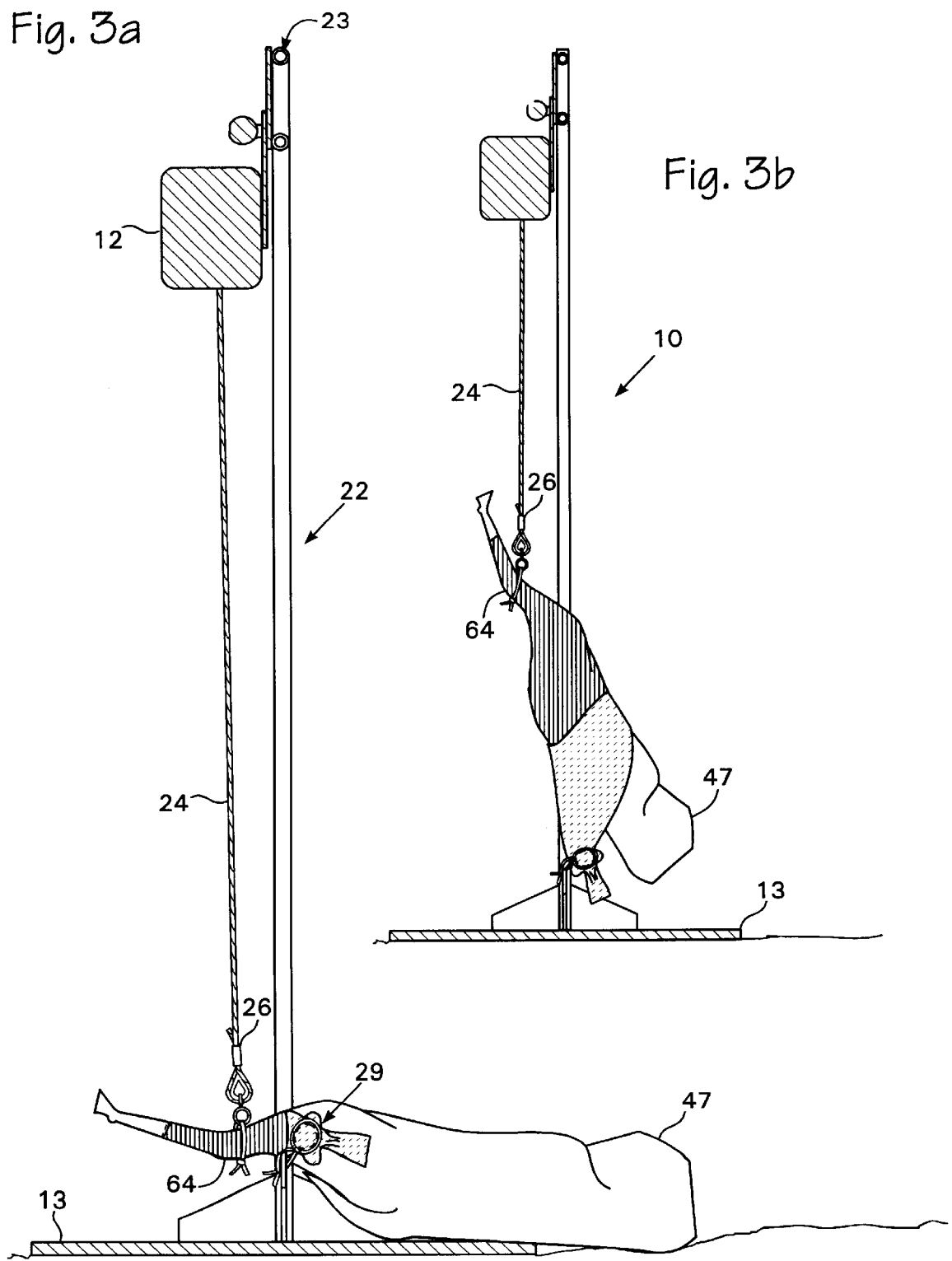

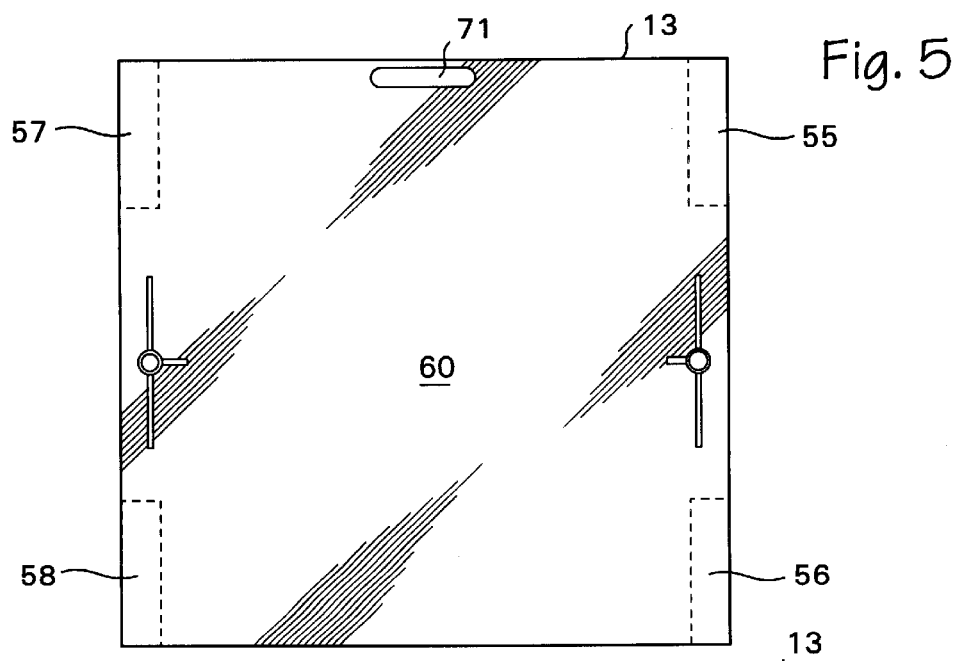
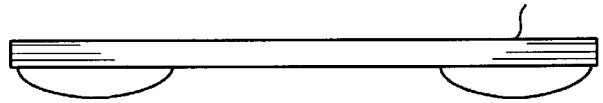
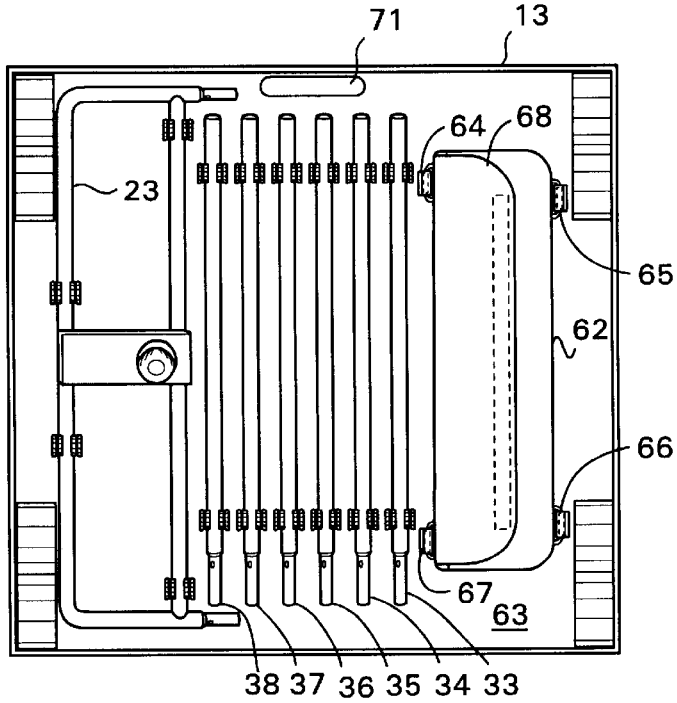
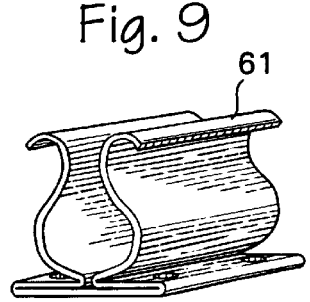

METHOD AND APPARATUS FOR SKINNING AN ANIMAL CARCASS

FIELD OF THE INVENTION

The invention relates, in general, to an apparatus for removing the skin from an animal carcass. In particular, the invention relates to a transportable winch operated apparatus for removing the skin from the carcass of an animal in the wild after the animal is killed. More particularly the invention relates to a transportable winch operated apparatus that has adjustable components to accommodate various sizes of carcasses that are to be skinned.

BACKGROUND OF THE INVENTION

If an animal is slaughtered in a commercial slaughtering house the skinning process involves either removing the skin intact or the animal is slaughtered and the skin is then removed. When a hunter kills an animal during the hunting season, he must carry or drag the animal to a proper slaughtering place or slaughter the animal in the wild where the animal was felled. Transporting the felled animal to a slaughtering house can be a time consuming and strenuous operation.

Generally, the outside or fur layer of the skin is not allowed to have contact with the inside flesh layer, or meat of the animal. If the outside skin of the animal comes in contact with the meat portion of the animal, contamination of the meat may result due to parasites or other contaminates found on animals in the wild.

In the past, attempts have been made to provide the hunter with an apparatus to remove the skin from an animal felled in the wild. One such attempt is U.S. Pat. No. 5,211,601 issued to Cope on May 18, 1993. The Cope patent discloses placing the carcass of the animal in proximity to a footed pole or member that has an overhead winch. A predetermined portion of the carcass's skin is secured to the footed portion of the apparatus and the hind legs are attached to the winch. The winch is activated and the skin is removed from the animal. While this apparatus may skin selective sizes of animals, it does not lend itself to skinning all types and sizes of animals. For example, if an animal's girth is less than the distance between the footed portions of the apparatus, a larger portion of the skin has to be peeled from the meat to reach and be secured to the footed portion. This pre-skinning adds to the risk of contaminating the meat of the animal. Portability of such an apparatus is limited. If the apparatus is disassembled, the subassemblies of the apparatus must be retained or bundled in some manner to be transported in bulk. The Cope patent subassemblies do not provide any structure to retain the apparatus after disassembly or means for easily transporting the apparatus once disassembled.

Another attempt to provide the hunter with an apparatus to remove the skin from an animal felled in the wild is U.S. Pat. No. 5,336,124 issued to Garside on Aug. 9, 1994. The Garside patent discloses a skinning apparatus that secures the antlers of the carcass to a tree and a portion of the skin of the animal is secured to a vehicle via a skin removal tool. The vehicle then moves in a direction opposite from the tree and the skin is removed from the carcass.

The skin removal tool is positioned at the nap or base of the neck of the carcass with a selected portion of the carcass's skin wedged in one end of the tool. The other end of the tool is secured to the vehicle. Tension is applied to the skin removal tool by the forward movement of the vehicle. The more tension applied by the vehicle the tighter the tool grasps the selected portion of skin. The skin removal tool has pointed or sharpened portions that engage the skin. Presumably, this is to hold the skin in place while the vehicle applies tension to the skin removal tool. This feature of the Garside patent tears or rips the skin in such a way as to cause the skin removal tool to lose its grip on the skin when tension is applied.

It would be desirable to have a winch operated transportable carcass skinning apparatus. The carcass skinning apparatus could be disassembled and stored as a unitary structure i.e., each subassembly would clamp or be retained by an associated subassembly structure. The unitary structure would then be transported to a slaughtering site or location and then be quickly reassembled for skinning the carcass. The carcass skinning apparatus would be selectively adjusted to the size of the animal to be skinned.

SUMMARY OF THE INVENTION

Slaughtering an animal in the wild presents inordinate difficulties to a hunter. Once the animal is felled, it must be transported to a slaughtering site or the slaughtering site has to be brought to the felled animal. Skinning or flaying the animal in the wild presents sanitary concerns regarding the contact of the meat with the outer skin or fur of the animal and other environmental hazards such as organic contamination from the surrounding slaughtering site. Hunters of game animals, to avoid sanitary and environmental hazards, generally transport the felled animal carcass to a professional slaughtering facility. Transporting the felled animal to a slaughtering site can be taxing for the individual hunter. Often the felled animal retreats to the brush or to a heavily wooded area to die. Extracting the felled animal from the brush and then physically dragging or carrying the animal to the slaughtering site is arduous.

The present invention provides the hunter or any user with a transportable winch operated carcass skinning apparatus. The present invention may, if desired, be transported to the felled animal or to a central slaughtering site in proximity to the felled animal. The transportable carcass skinning apparatus has a substantially rectangular platform to which a pair of sectional tubular stanchions is detachably secured thereto. A crossmember, a pair of adjustable carcass leg retaining members, a pair of adjustable carcass skin retaining members, and a carrying pouch are also detachably secured to the platform. The stanchions, the adjustable carcass leg retaining members, the adjustable carcass skin retaining members, and the pouch are detachably secured to the platform in such a way as to enable the user to transport the present invention as a unitary structure. A plurality of skids may, if desired, be mounted to the platform along with a gripping mechanism to assist the user in transporting the present invention in the wild.

Once the present invention is transported to the slaughtering site, the sectional tubular stanchions are detached from the platform and assembled end to end. The cross-member is detached from the platform and connected to one end of the pair of assembled stanchions. The cross-member and pair of stanchions are raised perpendicular to the platform. The other ends of the assembled pair of stanchions are detachably secured to the platform via a pair of oppositely spaced apart tubular stub members connected to the platform's top surface. The cross-member has an outwardly extending protuberance for the mounting of the winch. Once the winch is mounted to the cross-member's protuberance the present invention may function as a skinning site for felled animals.

The felled animal is positioned between the stanchions with its hindquarters in proximity to the tubular stub members. The pair of adjustable carcass leg retaining members are removed from the pouch and are secured to the animal's leg's i.e., above the animal's knee or knuckle joint and the winch's elongated carcass lifting member. The pair of adjustable carcass skin retaining members are removed from the pouch and secured to the animal's skin and to the hooks provided on the tubular stub members. The winch is energized by a battery and the animal carcass is raised parallel to the upright stanchions. The upward motion of the animal carcass with its skin in a stationary position pulls the skin from the animal.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which:

FIG. 2a illustrates a perspective view diagram of FIG. 1 with sectional portions forming stanchions, FIG. 3b illustrates a continuation of the side view diagram of FIG. 3a, FIG. 4 illustrates a top view diagram of the method of use of the present invention, FIG. 5 illustrates a top view diagram of the platform of FIG. 1, FIG. 6 illustrates a side view diagram of FIG. 5, FIG. 7 illustrates a front view of FIG. 5, FIG. 8 illustrates a top view diagram of FIG. 5 populated with the disassembled present invention, FIG. 9 illustrates a perspective view of the retaining mechanism of FIG. 8.

DETAILED DESCRIPTION OF THE PREFERRED EMBODIMENT OF THE PRESENT INVENTION

Figure 1:
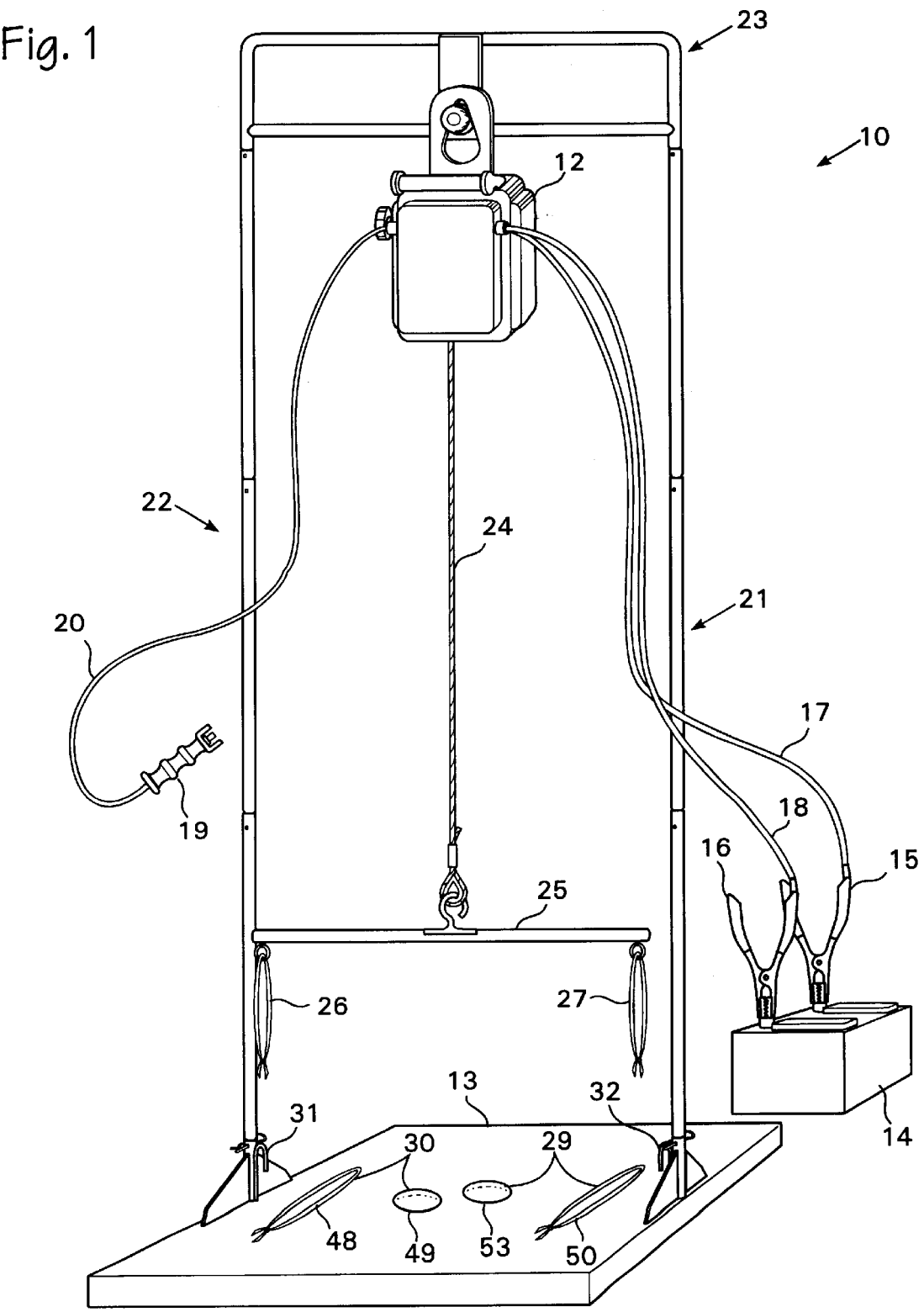
FIG. 1 illustrates a top level perspective view diagram of the preferred embodiment of the present invention.

Before describing in detail the particular improved transportable carcass skinning apparatus in accordance with the present invention, it should be observed that the invention resides primarily in a novel structural combination of conventional carcass skinning apparatus, discrete subsystems or subassembly components, associated control of the aforementioned carcass skinning apparatus, and not in the particular detailed configuration thereof. Accordingly, the structure, command, control, and arrangement of these conventional components and subassemblies have, for the most part, been illustrated in the drawings by readily understandable diagram representations and schematic diagrams. The drawings show only those specific details that are pertinent to the present invention in order not to obscure the disclosure with structural details which will be readily apparent to those skilled in the art having the benefit of the description herein. For example, winch 12, FIG. 1 has numerous connections to the present invention 10. Various portions of the winch connections to the present invention 10 have been simplified in order to emphasize those portions that are most pertinent to the invention. Thus, the top level diagram and the schematic diagram illustrations of the Figures do not necessarily represent the mechanical structural arrangement of the exemplary system, and are primarily intended to illustrate major hardware structural components of the system in a convenient functional grouping whereby the present invention may be more readily understood.

An Overview of the Present Invention

The preferred embodiment of the present invention 10, FIG. 1 is a transportable carcass skinning apparatus. The carcass skinning apparatus may, if desired, be disassembled and detachably stored on the bottom side of the base or platform 13. A plurality of sectional stanchions 21 and 22 are detachably secured to the platform 13. A cross-member 23 connects the stanchions 21 and 22 and provides the support structure for the winch 12. The winch 12 has a retractable cable 24 connected to an elongated carcass lifting member 25. The elongated carcass-lifting member 25 has a pair of adjustable and flexible carcass leg retaining members 26 and 27 that attach to the carcass's hind legs. The connection of the pair of flexible carcass leg retaining members 26 and 27 to the carcass is above the knee or knuckle joint 64, FIG. 3a. The adjustable and flexible carcass leg retaining members 26 and 27 detachably secure the carcass's hind legs to the elongated carcass-lifting member 25. A pair of adjustable carcass skin retaining members 29 and 30 is provided to retain a portion of the carcass's skin to hooks 31 and 32.

Any power source may be used to power the present invention 10, FIG. 1 that has sufficient power to operate the winch 12. For example, the present invention 10 may, if desired, be powered by a standard vehicle 12-volt battery 14. A pair of clip-on connectors 15 and 16 is provided to attach power cables 17 and 18 to the battery 14. The winch 12 may, if desired, have a remote control device 19 that is connected to winch 12 by cable 20. The remote control device 19 provides the operational functions for the winch 12 i.e., starting or stopping the winch 12.

A MORE DETAILED DISCUSSION OF THE PRESENT INVENTION

Figure 2B:
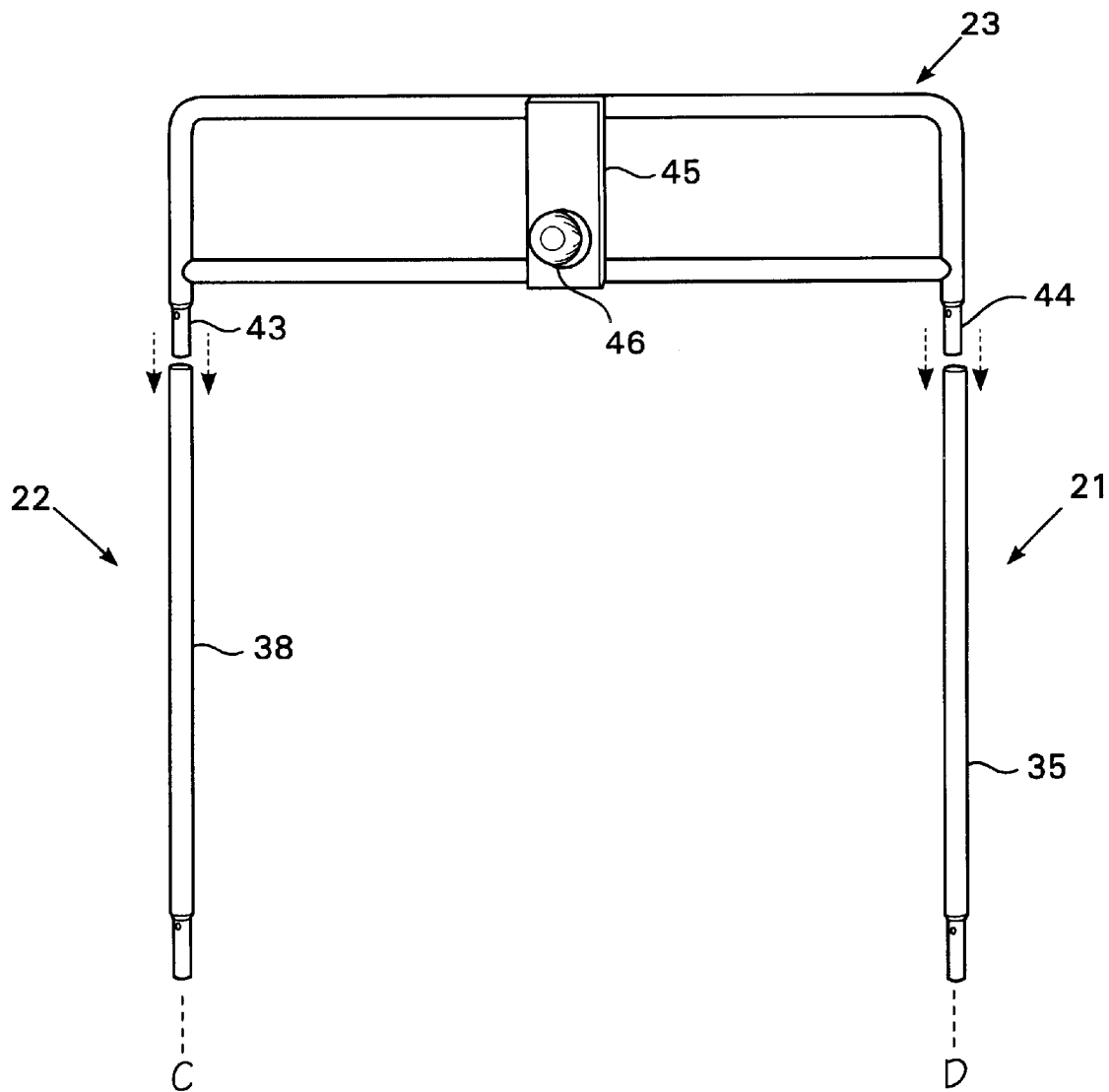
FIG. 2b illustrates a continuation of the perspective view diagram of FIG. 2a, FIG. 3a illustrates a side view diagram of a method of use of the present invention.

The stanchions 21 and 22, FIG. 2a and 2b may, if desired, be of any length to provide the necessary height or breadth to skin a selected carcass of selected vertical or hanging length measured from the carcass's hind legs to the nape of its neck. The stanchions 21 and 22 may be constructed from any type of material that provides the support structure for the cross-member 23 and the weight of the carcass to be skinned. For example, the stanchions 21 and 22 may be constructed from tubular steel, aluminum, or plastic. The construction of the stanchions 21 and 22 may, if desired, be unitary i.e., each stanchion is one continuous structural member. Preferably, stanchions 21 and 22 are comprised of sectional structural members. For example, stanchion 21 may be constructed from sections 33, 34, and 35. Stanchion 22 may be constructed from sections 36, 37, and 38.

A pair of tubular stub members 41 and 42, FIG. 2a are spaced apart and connected to the platform 13 in such a way as to provide a retaining vehicle for the stanchions 21 and 22, respectively. Preferably, the tubular stub members 41 and 42 are medially spaced and secured on the platform's 13 perimeter. Tubular stub members 41 and 42 are sized to receive a reduced diameter portion 39 of any given sectional member of the stanchions 21 or 22. A dimple or protuberance 40 may, if desired, be positioned on the reduced diameter portion 39 to provide a locking or tubular restraining vehicle for a given stanchion section. Tubular stub members 41 and 42 are structurally supported by brackets 43, 44 and 45, 46, respectively. A retaining clip 69 may, if desired, be detachably secured in any joint of the stanchions, cross-member or tubular stubs to further retain the stanchions, cross-member or stubs in their respective positions. For example, a pair of retaining clips 69 and 70 are selectively positioned in stanchion section 36, 33, and receiving stubs 42, 41, respectively to detachably secure the stanchions to the receiving stubs.

The pair of carcass skin hooks 31 and 32, FIG. 2a may, if desired, be of any length or material composition that enables the pair of adjustable carcass skin retainers 29 and 30 to be detachably secured thereto. For example, each carcass skin hook is manufactured from the same material as the stanchions 21 and 22. Carcass skin retainer hooks 31 and 32 are welded in place to tubular stub members 41 and 42, respectively.

The cross-member 23, FIG. 2b is an elongated substantially "D" shaped member. The cross-member 23 has a pair of outwardly extending protrusions 43 and 44 that have reduced diameters. The protrusions 43 and 44 may, if desired, be slidably inserted into the stanchions 22 and 21, respectively. The cross-member 23 has a mounted bracket 45 medially spaced within the "D" shaped member. The bracket 45 has an outwardly extending protrusion or knob 46 that provides a vehicle for the winch to be attached thereto. The cross-member 23 and its component parts may, if desired, be fabricated from the same or different materials as the stanchions 21 and 22.

Figure 4:
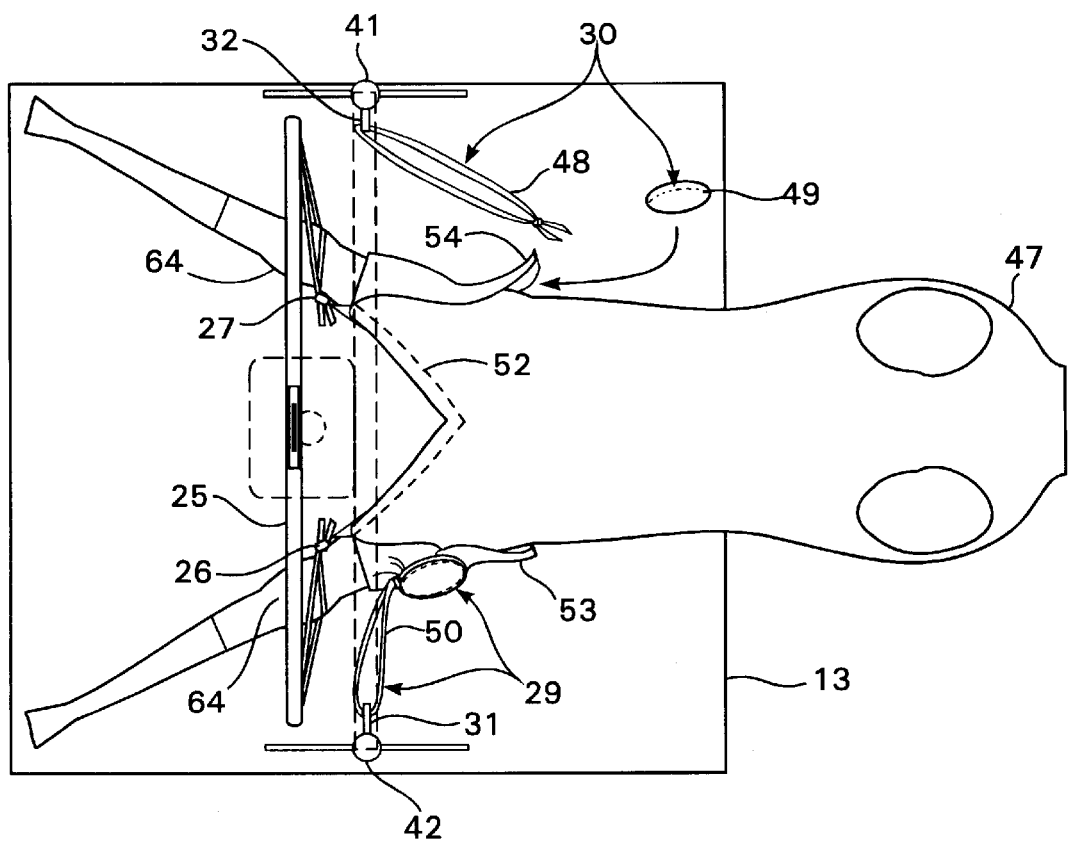

The pair of adjustable carcass skin retaining members 29 and 30 FIG. 4 may, if desired, be fabricated from flexible materials 48 and 50 and substantially hard material members 49 and 53 respectively. The flexible materials 48 and 50 may, if desired, be of any convenient length. The convenient or suitable length of the flexible materials 48 and 50 is dependent on the girth of the carcass to be skinned i.e., the smaller the girth of the carcass the longer the flexible material. Examples of flexible materials 48 and 50 are rope, cord, or wire that is formed in a continuous loop. The substantially hard material members 49 and 53 may, if desired, be sufficiently hard to withstand the compression of the skin about the surface of the substantially hard material members 49 and 53. The substantially hard material members 49 and 53 may, if desired, have a smooth rounded exterior to prevent the tearing or rupturing of the skin during the carcass skinning process. Examples of the substantially hard material members 49 and 53 are rounded wooden blocks, steel balls, or organic materials found at the carcass-skinning site. The substantially hard material members 49 and 53 are positioned within a portion of the carcass 47. The flexible materials 48 and 50 are tied around their respective substantially hard material members 49 and 53 and detachably secured to hooks 31 and 32.

The platform 13, FIG. 5 has at least one semi-circular ground engaging shoe or skid 55, 56, 57, and 58. One skid or, if desired, a plurality of skids may be affixed to the top or bottom surface of platform 13 in such a way as to enable transporting the platform by sliding. If desired, a wheel or a plurality of wheels may be substituted for the skid or skids. Preferably, the skids are affixed or mounted onto the bottom surface 60 in such a way as to be aligned with a handle 71. The skids 55, 56, 57, and 58 are adjacently spaced from the edges of the platform 13. The handle 71 may, if desired, be a cutout in the platform 13 or a multi-functional mechanical apparatus that serves as a handle.

A plurality of hold-down apparatus or snap-clips 61, FIG. 9 may, if desired, be mounted to the bottom surface 63 of platform 13, FIG. 8. The snap-clips 61 hold in place the various disassembled components of the present invention 10. The disassembled components of the present invention 10 may be positioned on the bottom surface 63 in any convenient manner. A bag 62 may, if desired, be affixed to the bottom surface 63. The bag 62 has a flap 68 that is detachably secured to the bag 62. The flap 68 permits entry or access to the interior of the bag 62. The bag 62 may, if desired, be detachably secured to the surface 63 by any convenient means. For example, a detachably secured means is a standard hook and loop fastener.

The best mode of operation of the present invention 10, FIG. 4 is as follows: The carcass 47 may, if desired, have the skin cut along a line 52 from one hindquarter to the other hindquarter. A portion of the skin or skin flap 54 from one hindquarter is pulled back to any convenient position and the substantially hard material member 49 or 53 is covered by the skin flap 54. One end of the flexible material 48 or 50 is secured around the substantially hard material member 49 or 53. The other end of the flexible material 48 or 50 is detachably secured to the hook 32 or 31. The other hindquarter of the carcass is operationally positioned in a likewise manner. The knee or knuckle joint 64 portion of each leg of the carcass 47, FIG. 3a is detachable secured to the elongated carcass-lifting member 25 by the adjustable and flexible carcass leg retaining members 26 and 27. The adjustable and flexible carcass leg retaining members 26 and 27 may, if desired, be of any convenient length that enables the securing of each leg of the carcass 47. The winch 12 is activated by the remote control 19, FIG. 1 and the winch cable 24, FIG. 3a begins to retract, lifting the carcass 47 upward. The remote control 19 may, if desired, have a selector switch that when moved in the forward direction the winch 12 retracts and when the switch is move to the rear direction the winch unwinds. The skin begins to be removed from the carcass 47 in such a way as to pull the skin over the fore quarters of the carcass. If desired, the fore quarters of the carcass 47 may be detachably secured to the present invention 10 and the skin be pulled in the direction from the fore quarters to the hindquarters.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. A winch operated transportable carcass skinning apparatus, the winch having operationally disposed thereto via a cable an elongated carcass lifting member, comprising:

a) a substantially rectangular platform having a top surface and a bottom surface;

b) a pair of stanchions perpendicularly disposed to said substantially rectangular platform, each said stanchion having one end detachably securable to said platform via a protuberance locking mechanism;

c) a cross-member detachably disposed between said pair of stanchions other ends, said cross-member having disposed thereon means for detachably securing the winch;

d) a pair of adjustable carcass leg retaining members each having one end secured to the winch's elongated carcass lifting member, said adjustable carcass leg retaining member's other ends detachably securable to the carcass's legs;

e) a pair of adjustable carcass skin retaining members each having one end secured to said substantially rectangular platform by hooks, said adjustable carcass skin retaining member's other end detachably securable to the carcass's skin;

whereby operationally activated the winch lifts the legs of the carcass via said pair of adjustable carcass leg retaining members while said pair of adjustable carcass skin retaining members hold the skin in place to said substantially rectangular platform, skinning the carcass.

2. A transportable carcass skinning apparatus as recited in claim 1 further comprising:

f) a plurality of retaining devices mountably disposed to said substantially rectangular platform's bottom surface, said retaining devices providing mechanisms for retaining individual tubular members forming said pair of stanchions and said cross-member;

g) a gripping member medially disposed along one edge of said substantially rectangular platform;

h) at least one skid mountably disposed on said substantially rectangular platform's bottom surface;

i) said skid aligned with said gripping member in such a way as to provide a sliding mechanism for said substantially rectangular platform when said substantially rectangular platform is being transported;

j) a pouch detachably secured to said substantially rectangular platform's bottom surface, said pouch providing storage for said adjustable leg retaining members and said adjustable carcass skin retaining members;

whereby said gripping member is clasped and the winch operated carcass skinning apparatus is transportable via said skids.

3. A transportable carcass skinning apparatus as recited in claim 2 further comprising a pair of tubular stub members oppositely space apart, connectively disposed to said substantially rectangular platform's top surface, said pair of tubular stub members detachable securing said pair of stanchions.

4. A transportable carcass skinning apparatus as recited in claim 3 further comprising said adjustable carcass skin retaining members being detachably securable to said substantially rectangular platform via said pair of oppositely spaced apart tubular stub members connectively disposed to said platform's top surface.

5. A transportable carcass skinning apparatus as recited in claim 4 wherein said pair of stanchions comprise a plurality of tubular sectional members connectively disposed end to end.

6. A transportable carcass skinning apparatus as recited in claim 5 wherein said cross-member spanning the distance between said oppositely spaced apart tubular stub members.

7. A transportable carcass skinning apparatus as recited in claim 6 wherein said tubular stub members being oppositely apart relative to the parallel edges of said substantially rectangular platform.

8. A transportable carcass skinning apparatus as recited in claim 7 wherein said means for detachably securing the winch being a protuberance outwardly extending from said cross-member thereby providing a detachable securing mechanism for the winch.

9. A winch operated transportable carcass skinning apparatus, the winch having operationally disposed thereto via a cable an elongated carcass lifting member, comprising:

a) a substantially rectangular platform having a top surface and a bottom surface, said platform having a griping member medially disposed along one edge of said platform;

b) a plurality of skids mountably disposed to said substantially rectangular platform's bottom surface, said skids being aligned with said gripping member in such a way as to provide a sliding mechanism for said substantially rectangular platform when said substantially rectangular platform is being transported;

c) a pair of sectional tubular stanchions, each said stanchion comprising a plurality of sectional tubular members, each sectional tubular member having a reduced diameter portion disposed at one end, said reduced diameter portions each having a protuberance disposed thereon, each said protuberance mating with respective sectional tubular members when connected end to end;

d) a securing mechanism detachably securing one end of said stanchion to said substantially rectangular platform;

e) a cross-member detachably disposed between said pair of stanchions other ends, said cross-member having disposed thereon a means for detachably securing the winch;

f) a pair of adjustable carcass leg retaining members each having one end secured to the winch's elongated carcass lifting member, said adjustable carcass leg retaining member's other ends detachably securable to the carcass's legs;

g) a pair of adjustable carcass skin retaining members each having one end secured to said substantially rectangular platform by hooks, said adjustable carcass skin retaining member's other end detachably securable to the carcass's skin;

thereby operationally activated the winch lifts the legs of the carcass via said pair of adjustable carcass leg retaining members while said pair of adjustable carcass skin retaining members hold the skin in place to said substantially rectangular platform, skinning the carcass.

10. A method for operating a transportable carcass skinning apparatus, the apparatus having a winch operationally disposed thereto, a cable and an elongated carcass lifting member operationally disposed to the winch, comprising the steps of:

a) providing a platform substantially rectangularly sized, said platform having a top surface and a bottom surface, said bottom surface having connectively disposed thereto at least one skid, said bottom surface having a plurality of retaining devices mountably disposed thereto, said retaining devices detachably securing the dissembled transportable skinning apparatus, said platform having mountably disposed thereto a griping mechanism medially disposed along one edge of said platform;

b) transporting said platform to a carcass skinning site via said skid and said gripping mechanism;

c) assembling the carcass skinning apparatus;

d) attaching the elongated carcass lifting member to the carcass;

e) attaching a portion of the carcass's hind quarter skin to the apparatus;

f) activating the winch attached to the elongated carcass lifting member; and g) raising the carcass upwardly via said winch and said elongated carcass lifting member thereby skinning the carcass.

11. A method for operating a transportable carcass skinning apparatus, as recited in claim 10 wherein said transporting said platform to said carcass skinning site comprises the step of sliding said platform on a pair of skids mounted onto said platform via said gripping mechanism.

12. A method for operating a transportable carcass skinning apparatus, as recited in claim 11 wherein said assembling the carcass skinning apparatus comprises the step of assembling a plurality of provided tubular stanchions end to end, mounting said stanchions to said platform, mounting a provided cross member to said stanchions and engaging the winch to said cross member.

13. A method for operating a transportable carcass skinning apparatus, as recited in claim 12 wherein said attaching the elongated carcass lifting member to the carcass comprises the step of securing the carcass's hind legs to the elongated carcass lifting member.

14. A method for operating a transportable carcass skinning apparatus, as recited in claim 13 wherein said attaching a portion of the carcass's hind quarter skin to the apparatus comprises the step of making an incision from the knee joint of one hind leg to the knee joint of the other hind leg, inserting one each provided adjustable carcass skin retaining member under the incised skin of each leg, securing said adjustable carcass skin retaining member to said platform.

15. A winch operated transportable carcass skinning apparatus as recited in claim 8 wherein said protuberance locking mechanism comprises a convex portion disposed on each said stanchion, each said convex portion mating with said respective tubular stub member thereby detachably securing each said stanchion to said platform via a protuberance locking mechanism.

* * * * *